United States Patent Office 2,844,573
Patented July 22, 1958

2,844,573
CATALYTIC HYDROGENATION

Earl W. Gluesenkamp and William E. Weesner, Dayton, Ohio, assignors to Monsanto Chemical Company, St. Louis, Mo., a corporation of Delaware No Drawing. Application December 23, 1955
Serial No. 555,191

2 Claims. (Cl. 260—92.8)

This invention relates to novel methods for making useful polymeric substances. More particularly, it relates to a method for catalytically hydrogenating polyvinyl chloride to form a polymeric substance having a combination of the desirable properties of polyethylene and polyvinyl chloride.

Polyvinyl chloride is a well known, widely used and commercially available plastic material. The polymer itself is relatively brittle (flex temperature somewhat above 70° C.), so that it can practically never be used without a plasticizer. The need for a plasticizer places many limitations upon the use of polyvinyl chloride, and the use of a plasticizer raises many problems for which there is not always a satisfactory solution. Consequently, there is a continuing need for an unplasticized polymer having the desirable properties of a plasticized polyvinyl chloride composition.

The relatively recent development of polyethylene plastic materials was at least a partial answer to the polyvinyl chloride problem—especially in that polyethylene can be made with a very low flex temperature without requiring a plasticizer. Polyethylene does have some disadvantages, however, one of which is that it will support combustion.

It has been supposed that copolymers of ethylene and vinyl chloride might have properties which would be a desirable compromise between those of polyethylene and polyvinyl chloride. For example, such a copolymer would have a lower flex temperature than the polyvinyl chloride, yet would not support combustion like polyethylene. However, previous attempts to copolymerize ethylene and vinyl chloride have been unsuccessful—the reaction product being primarily liquid or oily materials having no resemblance to either of the homopolymers or to the desired copolymer. Other attempts to form a partially chlorinated polyethylene (or, alternatively, a partially dehalogenated polyvinyl chloride) have generally resulted in degradation or rearrangement of the polymer to a radically different material not having the desired properties. One method (utilizing lithium hydride and/or lithium aluminum hydride) has been carried out successfully, but this method involves the use of expensive and hazardous materials.

It has now been found that polyvinyl chloride can be catalytically hydrogenated in the presence of a palladium catalyst to replace a substantial proportion of the chlorine atoms with hydrogen atoms. This reaction can be conveniently carried out by dissolving the polyvinyl chloride in a solvent, adding the catalyst, and reacting with hydrogen at elevated temperatures until the desired amount of chlorine has been replaced. The catalyst is then removed by filtration, sedimentation and decantation, or centrifugation and the solvent removed to recover the desired product.

The choice of a solvent is not particularly critical. Any one which is inert with respect to the reactants, catalyst and product and having a reasonably high solubility for polyvinyl chloride is suitable. Examples of such solvents are organic materials such as dimethylacetamide, dimethylformamide, tetrahydrofuran, etc. It will generally be desirable to make the concentration of polyvinyl chloride in the solvent as high as possible without making the solution too viscous. In most solvents, useful concentrations will usually run between about 2 and about 10 weight percent.

In general, the palladium catalyst can be utilized in any of the numerous ways in which metallic palladium is used to catalyze other liquid-phase reactions. For example, the palladium can be used in the form of a supported catalyst in which the palladium is deposited on a solid material such as barium sulfate, charcoal, calcium carbonate, silica gel, kieselguhr, aluminum oxide, strontium carbonate, zeolite, etc. Such catalysts are commercially available in a number of different forms having varying palladium content. Supported catalysts containing between ½ weight percent and about 20 weight percent of palladium are generally suitable, between about 2 and about 10 weight percent of palladium being preferred.

The palladium catalyst can also be utilized in other forms—for example, as a colloidal sol or as palladium black, both of which are prepared by well known methods.

The total amount of catalyst utilized will depend a good bit upon the particular form utilized (and especially upon the effective exposed surface of the catalyst), the desired reaction rate, etc.—but will generally run between about 0.001 weight percent and about 20 weight percent, and preferably between about 0.01 weight percent and about 5 weight percent, based upon the amount of polyvinyl chloride reactant.

The hydrogenation can be carried out at atmospheric or superatmospheric pressures of hydrogen, but the reaction rate is greater at superatmospheric pressures. Consequently, it will generally be more desirable to carry out the reaction at elevated pressures, e. g., between about 100 and about 5000 P. S. I. of hydrogen, and preferably between about 500 and about 3000 P. S. I. of hydrogen.

The reaction temperature will depend to a large extent upon the desired rate of reaction. However, if the temperature becomes too high, an excessive amount of polymer degradation is likely to result. Suitable temperatures will generally range between about 35° C. and about 150° C., and preferably between about 50° C. and about 100° C.

The immediate by-product of the hydrogenation of the polyvinyl chloride will be hydrogen chloride. Consequently, it will generally be desirable to add to the reaction mass an alkaline agent to neutralize this hydrogen chloride as it is formed. Examples of suitable alkaline materials are sodium carbonate, calcium hydroxide, pyridine, trialkylamines, cyclohexylamine, etc.

The total reaction time will depend not only upon the rate of reaction (as affected by the above-discussed variables), but also upon the desired degree of removal of chlorine from the polyvinyl chloride. In general, it will take several hours to effect a substantial removal of chlorine (e. g., 20 percent or more). The most desirable polymer products are those having at least 40 percent of the chlorine removed.

After the reaction has been completed and the solids have been filtered or otherwise separated from the reaction mass, the polymeric product is precipitated from the reaction solution by adding a liquid which is miscible with the polyvinyl chloride solvent, but in which the polymer product is insoluble. Examples of such materials are methyl or ethyl alcohol, water, hexane, etc. During this precipitation of the polymer product, it will be desirable to agitate the solution quite vigorously (for example, with a Waring Blendor or similar equipment) in order to break up the product as it precipitates. If this is not done, there is a tendency to precipitate in a stringy or gummy mass and make it very difficult to remove all of the solvent. If the vigorous agitation includes a shearing action (such as with the aforementioned Waring Blendor), then the polymer product can be readily washed and dried and obtained in the form of a fluffy powdery product.

The following detailed examples will serve to illustrate further the process of the present invention.

Example 1

Fifty grams of polyvinyl chloride was dissolved in 600 ml. of dimethylacetamide, and then 20 grams of reagent grade sodium carbonate and 2 grams of palladium on charcoal (5%) were added to the solution. The mixture was charged to a one-liter stainless steel rocking bomb, flushed with hydrogen, and then pressured with hydrogen to about 900 lbs. per square inch. The temperature of the bomb was raised to about 95° C. and maintained there for about 24 hours. The resulting mixture was filtered through Attapulgus earth and the filtrate drowned in about four times its volume of methyl alcohol in an Osterizer mixer to precipitate the polymer product. After filtering, rinsing with methyl alcohol, and vacuum drying for about 16 hours at room temperature, the product was obtained as a fluffy white powder, analyzing 40.44% chlorine (corresponding to about 50% removal of chlorine from polyvinyl chloride). The molded powder had a density of 1.2553, tensile strength of 3000 lbs. per square inch, elongation of 750% (at break), and flex temperature of about 6° C.

Example 2

Fifty grams of polyvinyl chloride was dissolved in 500 ml. of dimethylacetamide, and 20 grams of sodium carbonate and 1 gram of palladium on charcoal (5%) were added to the solution. The foregoing mixture was placed in a one-liter stainless steel hydrogenation bomb, pressured to 900 lbs. with hydrogen, then heated to about 100° C. and held at that temperature for about 17 hours. The resulting reaction mass was filtered through Attapulgus earth under a nitrogen atmosphere, and the filter cake was rinsed with 80 ml. of dimethylacetamide. A portion of the filtrate was diluted with about twice its volume of ice water while agitating the mixture in an Osterizer mixer. The resulting precipitate was washed with additional water and vacuum-dried at room temperature. A molded sample of the polymer product had a density of about 1.281, flex temperature of about 28° C., tensile strength of about 2500 lbs. per square inch, and elongation of about 293%.

Example 3

Fifty grams of polyvinyl chloride was dissolved in 600 ml. of dimethylacetamide, and 25 grams of sodium carbonate and 2 grams of palladium on charcoal (5%) were added to the solution. The mixture was heated in a stirred reactor and maintained at a temperature between about 90 and about 100° C. for about 6½ hours, and between about 105° C. and about 110° C. for an additional 7½ hours. Hydrogen at atmospheric pressure was continuously bubbled through the mixture during the entire 14 hour reaction period. The resulting mixture was diluted with 600 ml. of additional dimethylacetamide and filtered through Attapulgus earth. The filtrate was drowned in about four times its volume of methyl alcohol in an Osterizer mixer to precipitate the polymer product. The resulting precipitate was washed with additional methyl alcohol and vacuum dried at room temperature. A molded sample of the polymer product had a density of 1.3304, flex temperature about 39° C., tensile strength about 500 lbs. per square inch, and elongation about 135%.

We claim:

1. The method of catalytically hydrogenating polyvinyl chloride by reacting said polyvinyl chloride with hydrogen in the presence of a palladium catalyst under sufficiently high temperature and pressure and for a sufficient length of time to replace at least 20% of the chlorine atoms with hydrogen atoms.

2. The method of catalytically hydrogenating polyvinyl chloride by reacting said polyvinyl chloride with hydrogen at a temperature between about 30° C. and about 150° C. at a pressure in excess of 100 pounds per square inch for a sufficient length of time to replace at least 20 percent of the chlorine atoms with hydrogen atoms, said reaction being carried out in the presence of a catalytic amount of metallic palladium.

References Cited in the file of this patent

UNITED STATES PATENTS

| | | |
|---|---|---|
| 2,199,992 | Hale | May 7, 1940 |
| 2,716,642 | Cotman | Aug. 30, 1955 |